United States Patent
Ohtaki et al.

(10) Patent No.: US 6,961,394 B2
(45) Date of Patent: Nov. 1, 2005

(54) DIVERSITY RECEIVING APPARATUS CAPABLE OF PREVENTING REDUCTION OF C/N RATIO

(75) Inventors: Yukio Ohtaki, Fukushima-kan (JP); Toru Oyama, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/811,648

(22) Filed: Mar. 29, 2004

(65) Prior Publication Data

US 2004/0203545 A1 Oct. 14, 2004

(30) Foreign Application Priority Data

Apr. 9, 2003 (JP) ........................................ 2003-105792

(51) Int. Cl.$^7$ .......................... H04L 27/06; H04B 17/02
(52) U.S. Cl. ...................................... 375/347; 455/139
(58) Field of Search ................................ 375/267, 347, 375/316; 455/137–139, 132

(56) References Cited

U.S. PATENT DOCUMENTS

| | | | | | |
|---|---|---|---|---|---|
| 4,334,316 A | * | 6/1982 | Tanaka | .................... | 455/139 |
| 4,373,207 A | * | 2/1983 | Hecken | ...................... | 455/139 |
| 5,203,023 A | * | 4/1993 | Saito et al. | .................. | 455/133 |
| 5,513,222 A | * | 4/1996 | Iwasaki | ...................... | 375/347 |

FOREIGN PATENT DOCUMENTS

JP      2003-318857      11/2003

OTHER PUBLICATIONS

Digital Musen Tsushin–no Henfukucho (*Modulation/Demodulation in Digital Wireless Communication*), written by Yoichi Saito, p. 189–191, Fig. 5.19.

* cited by examiner

*Primary Examiner*—Tesfaldet Bocure
(74) *Attorney, Agent, or Firm*—Brinks Hofer Gilson & Lione

(57) ABSTRACT

A diversity receiving apparatus comprises a plurality of antennas, a plurality of receiving circuits connected to the plurality of antennas, respectively, an adding unit for adding reception signals output from the respective receiving circuits, and a plurality phase shifting units for making phases of the reception signals to be input into the adding unit equal. A level comparing unit, for comparing the levels of the reception signals output from the respective receiving circuits, is provided. Phases of reception signals other than a maximum-level reception signal are controlled so as to have the same phase as the phase of the maximum-level reception signal, and the phase-controlled signals are input into the adding unit.

2 Claims, 2 Drawing Sheets

DIVERSITY RECEIVING APPARATUS CAPABLE OF PREVENTING REDUCTION OF C/N RATIO

This application claims the benefit of priority to Japanese Patent Application No. 2003-105792, herein incorporated by reference.

BACKGROUND OF THE INVENTION

1. Field of the Invention

The present invention relates to a diversity receiving apparatus suitable for a vehicle-mounted receiver for terrestrial digital TV broadcasting that is driven using an OFDM (Orthogonal Frequency Division Multiplex) method.

2. Description of the Related Art

FIG. 2 shows a conventional diversity receiving apparatus in which a gain synthesizing method is used to maximize a C/N ratio after diversity synthesis. In FIG. 2, one receiving system comprises an antenna 21 and a receiver 22 connected to the antenna 21, and the other receiving system comprises an antenna 23 and a receiver 24 connected to the antenna 23.

An adder 25 adds a reception signal output from the receiver 22 to a reception signal output from the receiver 24 to synthesize them, and a phase shifter 26 is provided between the receiver 24 and the adder 25. In addition, a phase difference detector 27 detects the phase difference between the reception signal output from the receiver 22 and the reception signal output from the receiver 24 and thus the phase shifter 26 is controlled based on the detected results.

According to this configuration, when a phase difference exists between two reception signals, the phase difference detector 27 controls the phase shifter 26 to remove the phase difference. As a result, two reception signals to be input into the adder 25 are controlled to have the same phases, and thus the signal synthesized by the adder 25 has the maximum C/N ratio (for example, see Non-Patent Document 1).

[Non-Patent Document 1]

'Modulation and Demodulation in Digital Wireless Communication' written by Yoichi Saito and published by the Institute of Electronics, Information and Communication Engineers of Japan (IEICE) on Feb. 10, 1996, pp. 189 to 191 and FIG. 5.19

The reception signal synthesized by the adder 25 is converted into a base-band signal by OFDM demodulating means (not shown).

According to the aforementioned method, for example, when the antenna 21 receives a signal having a low C/N ratio that mainly includes noise components and the antenna 22 receives a signal having a high C/N ratio that mainly includes signal components, phase of the signal having a high C/N ratio is controlled so as to match to the phase of the signal having a low C/N ratio. Therefore, in an extreme case, the phase of the signal having a high C/N ratio is continuously varied for phase matching, and thus it is difficult to improve a C/N ratio of the synthesized signal and to synchronize signals.

SUMMARY OF THE INVENTION

The present invention is made to solve the above problems, and it is an object of the present invention to prevent reduction in C/N ratio when phases of the signals to be input into adding means are matched to perform diversity synthesis and to easily synchronize signals during demodulation.

In order to achieve the above object, there is provided a diversity receiving apparatus comprising a plurality of antennas, a plurality of receiving circuits connected to the plurality of antennas, respectively, adding means for adding reception signals output from the respective receiving circuits, and phase shifting means for making phases of the reception signals to be input into the adding means equal, wherein level comparing means for comparing the levels of the reception signals output from the respective receiving circuits is provided, phases of reception signals other than the maximum-level reception signal are controlled so as to match to the phase of the maximum-level reception signal, and then the phase-controlled signals are input into the adding means.

Furthermore, according to the present invention, the diversity receiving apparatus further comprises phase controlling means for controlling the amount of phase shift of the phase shifting means, the phase shifting means is provided in each receiving system between the antenna and the adding means, and the phase controlling means is controlled by the level comparing means so as to control only the amount of phase shift of the phase shifting means corresponding to the reception signals other than the maximum-level reception signal.

DESCRIPTION OF THE PREFERRED EMBODIMENT

Figure 1:
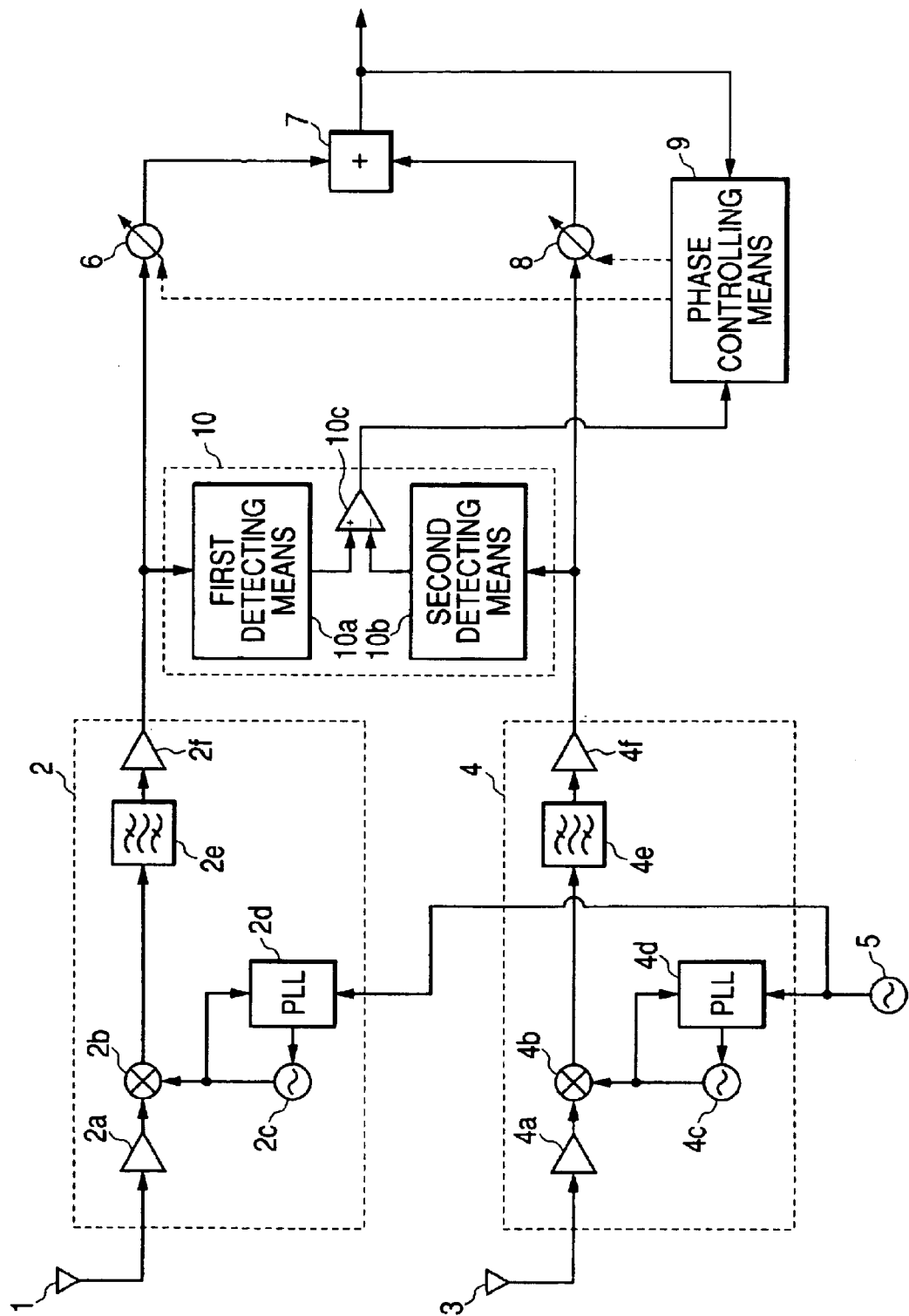
FIG. 1 is a circuit diagram illustrating the structure of a diversity receiving apparatus according to the present invention.
Figure 2:
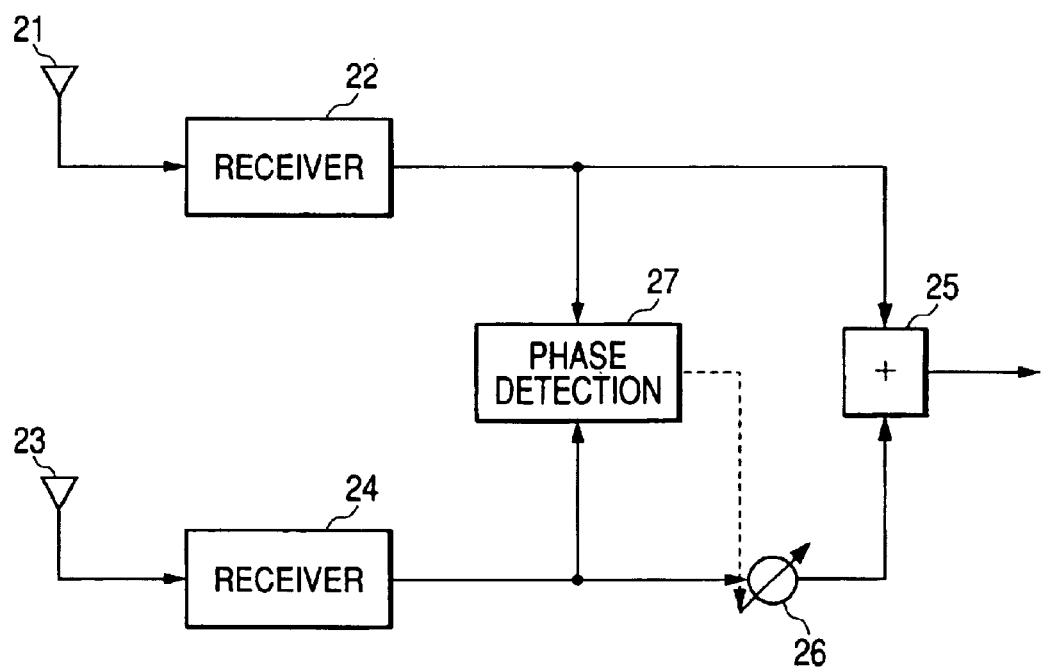
FIG. 2 is a circuit diagram illustrating the structure of a conventional diversity receiving apparatus.

A diversity receiving apparatus according to the present invention will now be described with reference to FIG. 1. FIG. 1 illustrates two receiving systems.

A first receiving circuit 2 is connected to a first antenna 1. The first receiving circuit 2 comprises a first low-noise amplifier 2a for amplifying a reception signal, a first mixer 2b for converting frequency of the amplified signal, a first oscillator 2c for supplying a local oscillation signal to the first mixer 2b, a first PLL circuit 2d for controlling an oscillation frequency of the first oscillator 2c, a first intermediate frequency amplifier 2f for amplifying an intermediate frequency signal output from the first mixer 2b, and a first band-pass filter 2e interposed between the first mixer 2b and the first intermediate frequency amplifier 2f.

A second receiving circuit 4 is connected to a second antenna 3. The second receiving circuit 4 comprises a second low-noise amplifier 4a for amplifying a reception signal, a second mixer 4b for frequency-converting the amplified signal, a second oscillator 4c for supplying a local oscillation signal to the second mixer 4b, a second PLL circuit 4d for controlling an oscillation frequency of the second oscillator 4c, a second intermediate frequency amplifier 4f for amplifying an intermediate frequency signal output from the second mixer 4b, and a second band-pass filter 4e provided between the second mixer 4b and the second intermediate frequency amplifier 4f.

A reference oscillator 5 supplies a reference signal to the first PLL circuit 2d and the second PLL circuit 4d.

The signal (the intermediate frequency signal) output from the first receiving circuit 2 is input into adding means 7 via first phase shifting means 6, and the signal output from the second receiving circuit 4 is input into the adding means 7 via second phase shifting means 8. Note that the first and second phase shifting means 6 and 8 do not necessarily interpose between the receiving means 2 and 4 and the adding means 7, respectively. Alternatively, for example, the first and second phase shifting means 6 and 8 may be provided in the receiving means 2 and 4, respectively, to vary the phase of a local oscillation signal. In short, the first and second phase shifting means 2 and 4 may be provided at any position where the respective reception signals which are input into the adding means 7 to have the same phase. Phase controlling means 9 controls the amount of phase shift imparted by the first and second phase shifting means 6 and 8.

Furthermore, level comparing means 10 is provided for comparing the levels of the signal output from the first receiving circuit 2 and the signal output from the second receiving circuit 4 and for controlling the phase controlling means based on the level difference.

The level comparing means 10 comprises first detecting means 10a for detecting the level of the signal output from the first receiving circuit 2, second detecting means 10b for detecting the level of the signal output from the second receiving circuit 4, and comparing means 10c for comparing the two detected levels. A detection signal output from the first detecting means 10a is input to a non-inversion input terminal (+) of the comparing means 10c, and a detection signal output from the second detecting means 10b is input to an inversion input terminal (−) thereof. Therefore, the comparing means 10c outputs a voltage corresponding to the difference between levels detected by the detecting means 10a and 10b. In this way, the comparing means 10c controls the phase controlling means 9.

The phase controlling means 9 controls two reception signals to be input into the adding means 7 to have the same phase based on the comparison results from the comparing means 10c, so that the added signal has the maximum level. That is, the phase controlling means 9 is controlled by the comparing means 10c such that phases of signals other than the maximum level signal among the signals to be input into the adding means 7 are controlled to have the same phase as the maximum level signal. FIG. 1 illustrates a case in which two signals are received. Therefore, example, when the level of the signal output from the first receiving circuit 2 is high and the level of the signal output from the second receiving circuit 4 is low, the signal output from the second receiving circuit 4 is a signal other than the maximum level signal.

Thus, the phase controlling means 9 does not control the phase of the signal output from the first receiving circuit 2, but controls the second phase shifting means 8 such that the phase of the signal output from the second receiving circuit 4 is varied until the signal output from the adding means 7 reaches the maximum level. As such, when two signals to be input into the adding means 7 are controlled to have the same phase, the level of the added signal is maximized.

During this process, since the phase of the maximum level signal output from the first receiving circuit 2 is not controlled, the phase of the signal is not varied, and thus a C/N ratio thereof is not reduced. Therefore, synchronization can be easily achieved when demodulated by using OFDM demodulating means (although not shown, which is connected to the latter part of the adding means 7).

As a specific example, two receiving systems including antennas and receiving circuits are illustrated in FIG. 1. However, the present invention is not limited thereto and may be formed of three receiving systems including antennas and receiving circuits. In short, preferably, the levels of reception signals input into the respective receiving systems are compared with each other by the level comparing means 10, the phases of signals other than the maximum level signal are controlled so as to have the same phase as the phase of the maximum level signal, and the phase-controlled signals are input into the adding means 7.

Furthermore, the level comparing means 10 may be formed of a digital circuit as well as an analog circuit to digitally control the phase controlling means 9. Also, it is preferable that the comparing means 10c have a hysteresis characteristic in order to stabilize the operation of the phase controlling means 9.

As described above, a diversity receiving apparatus according to the present invention comprises a plurality of antennas, a plurality of receiving circuits connected to the plurality of antennas, respectively, adding means for adding reception signals output from the respective receiving circuits, and phase shifting means for making phases of the reception signals to be input into the adding means equal, wherein level comparing means for comparing the levels of the reception signals output from the respective receiving circuits is provided, the phases of signals other than the maximum level signal are controlled so as to have the same phase as the phase of the maximum level signal, and the phase-controlled signals are input into the adding means. Thus, since the phase of the maximum level signal is not controlled, the phase thereof is not varied, and a C/N ratio thereof is not reduced.

Furthermore, according to the present invention, the diversity receiving apparatus further comprises phase controlling means for controlling the amount of phase shift of the phase shifting means, the phase shifting means is provided in every receiving system between the antenna and the adding means, and the phase controlling means is controlled by the level comparing means so as to controls only the amount of phase shift of the phase shifting means corresponding to the reception signals other than the maximum level signal. Therefore, even though a signal input into any receiving system has the maximum level, the phases of the signals other than the maximum level signal can be controlled.

What is claimed is:

1. A diversity receiving apparatus comprising a plurality of antennas, a plurality of receiving circuits connected to the plurality of antennas, respectively, adding unit to add reception signals output from the respective receiving circuits, and a plurality of phase shifting units to make phases of the reception signals to be input into the adding unit equal, wherein level comparing unit to compare the levels of the reception signals output from the respective receiving circuits is provided, and wherein phases of reception signals other than a maximum-level reception signal are controlled so as to have the same phase as a phase of the maximum-level reception signal, and the phase-controlled signals are input into the adding unit.

2. The diversity receiving apparatus according to claim 1, further comprising a phase controlling unit for controlling an amount of phase shift of the plurality of phase shifting units, wherein each of the plurality of the phase shifting units is provided in each receiving system from the antenna to the adding unit, and wherein the phase controlling unit is controlled by the level comparing unit so as to control only the amount of phase shift of the plurality of the phase shifting units corresponding to the reception signals other than the maximum-level reception signal.

* * * * *

UNITED STATES PATENT AND TRADEMARK OFFICE
CERTIFICATE OF CORRECTION

PATENT NO. : 6,961,394 B2  
DATED : November 1, 2005  
INVENTOR(S) : Yukio Ohtaki et al.

Page 1 of 1

It is certified that error appears in the above-identified patent and that said Letters Patent is hereby corrected as shown below:

<u>Title page,</u>  
Item [75], Inventors, delete "Fukushima-kan" and substitute -- Fukushima-ken --.

Signed and Sealed this

Twenty-third Day of May, 2006

JON W. DUDAS  
*Director of the United States Patent and Trademark Office*